United States Patent [19]
Nicholas

[11] Patent Number: 5,797,209
[45] Date of Patent: Aug. 25, 1998

[54] ANCHORED, RETRIEVABLE MULTI-LINE FISH CATCHING DEVICE

[76] Inventor: Timothy A. Nicholas, 40 W. Washburn St., New London, Ohio 44851

[21] Appl. No.: 642,044

[22] Filed: May 6, 1996

[51] Int. Cl.⁶ .................................................. A01K 91/04
[52] U.S. Cl. ................................................ 43/4; 43/42.74
[58] Field of Search ............................. 43/4, 42.74, 43.1, 43/43.15, 44.84; 441/3, 26, 27

[56] References Cited

U.S. PATENT DOCUMENTS

| | | | |
|---|---|---|---|
| 2,289,663 | 7/1942 | Linhares | 43/42.74 |
| 2,551,998 | 5/1951 | Groot | 43/43.15 X |
| 2,792,663 | 5/1957 | Sinclair | 43/43.1 X |
| 2,975,541 | 3/1961 | Birrell | 43/43.15 |
| 3,177,465 | 4/1965 | Wyatt | 43/17.1 X |
| 3,744,178 | 7/1973 | Denny | 43/44.84 X |
| 3,878,636 | 4/1975 | George | 43/42.74 |
| 4,077,076 | 3/1978 | Masters | 9/8.3 E |
| 4,340,192 | 7/1982 | Burris, III | 43/3 X |
| 4,998,371 | 3/1991 | Driesel | 43/42.16 |
| 5,048,219 | 9/1991 | Georgesau | 43/4 |
| 5,207,013 | 5/1993 | Bartok et al. | 43/4 |
| 5,207,017 | 5/1993 | Litrico | 43/100 |
| 5,222,317 | 6/1993 | Georgesau | 43/4 |
| 5,309,666 | 5/1994 | Prince | 43/43.13 |
| 5,438,790 | 8/1995 | Rigney | 43/42.24 |

*Primary Examiner*—Joseph J. Hail, III
*Assistant Examiner*—Anthony Ojini
*Attorney, Agent, or Firm*—John D. Gugliotta; David L. Volk

[57] ABSTRACT

A fish catching device is provided that is anchored, retrievable, and supports a plurality of fishing lines. A main body is buoyant and floatable, and is formed from a plurality of upper surfaces, each of which supports an extension arm. A bottom surface forms and supports a female threaded anchoring orifice, and an anchor reel threadingly affixes within the anchoring orifice and supports a sinker via a sinker line. Additionally, a plurality of line segments are provided and supported each by an extension arm, and retain an float and fishing hook to provide a plurality of individual fishing sites upon one device.

17 Claims, 3 Drawing Sheets

ANCHORED, RETRIEVABLE MULTI-LINE FISH CATCHING DEVICE

BACKGROUND OF THE INVENTION

1. Field of the Invention

The present invention relates generally to devices for catching fish and, more particularly, to an anchored device retrievable by a standard fishing pole capable of simultaneously catching a plurality of fishing.

2. Description of the Related Art

In the related art, many methods are known for catching fishing. Whether for sport or commerce, the methods and tools range from a simple stick, line, and hook combination, to large commercial netting operations. For the individual fisherman, netting provides little sport and is impractical as a recreational activity. However, for the individual fisherman the ability for an afternoon's recreation to also provide a meal is also seriously limited by the singular line and hook available for use by an individual.

Numerous attempts have been made to correct for the foregoing problems. For example, in U.S. Pat. No. 5,222,317, issued in the name of Georgescu, a tethered floating fish catching device is disclosed having a float supporting a plurality of fishing rods. The float is tethered to an anchor, and is designed to be set and later retrieved by a fisherman. However, the device disclosed in the Georgescu reference floats atop the surface of the water, and therefore is greatly affected by the surface weather conditions.

Also, in U.S. Pat. No. 5,207,013, issued in the name of Bartok et al., a free floating fishing tool is disclosed having a buoyant container supporting a fishing line and hook. Similarly, in U.S. Pat. No. 5,048,219, also issued in the name of Georgescu, a free floating fish catching device is disclosed which 'inverts' when a fish is caught, and includes a lifting hook to aid in the removal of the fish and device from the water. Although a plurality of either of such devices could be utilized to increase a fisherman's success, such devices would pose time consuming an potentially burdensome retrieval problems.

Consequently, a need has been felt for providing an apparatus and method which is anchored, is retrievable by a standard fishing pole, and is capable of simultaneously catching a plurality of fishing.

SUMMARY OF THE INVENTION

It is therefore an object of the present invention to provide an improved fish catching device.

Features of the present invention provide an improved fish catching device capable of simultaneously catching a plurality of fishing, which is also anchored and retrievable by a standard fishing pole.

Briefly described according to one embodiment of the present invention, a fishing rig is utilized formed of a pyramidal support body utilized for supporting fishing lines, weights, extension arms, foam floaters and hooks. There is a weight at the end of the fishing rig to avoid having the rig float to the top of the water. Right above the weight, three plastic arms extend from the rigs body. Styrofoam floaters and hooks are extended through the ends of the plastic arms. This mechanism is collapsible for easy storage in a tackle box.

An advantage of the present invention is that the trap has three extensions, it allows the fisherman to catch more than one fish at a time. Further, a preferred embodiment of the present invention is as easy to use as a regular fishing rod: simply bait all of the hooks, release the trap into the water, and wait for the fish to start nibbling. Adjustability of depth and collapsibility for storage also provide advantages to the user.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
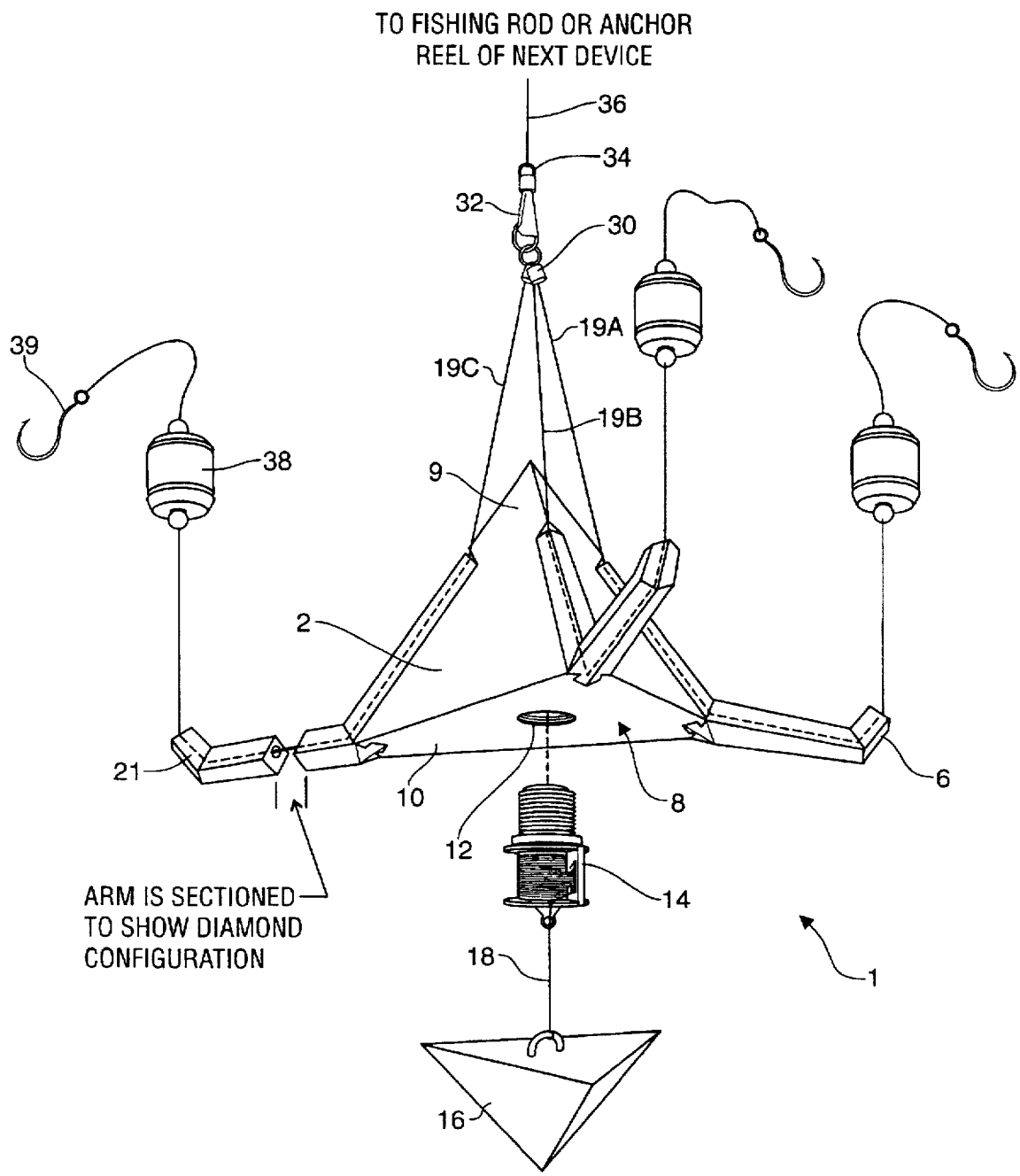
FIG. 1 is a perspective view of a fish catching device according to the preferred embodiment of the present invention.

Referring now to FIG. 1, a fish catching device 1 is shown, according to the present invention, that is anchored, retrievable, and supports a plurality of fishing lines. As shown, the device 1 has a main body 2 that is buoyant and floatable. The body 2 forms a plurality of upper surfaces 4, each of which supports an extension arm 6. Although it is currently envisioned that the main body 2 can be formed of an essentially solid, multi-faceted, floatable, rigid plastic member, in the preferred embodiment a hollow cavity 8 is formed within the body 2. When utilized in addition to floatable plastic construction, the hollow cavity 8 provides additional buoyancy, as well as location for injecting foam in order to increase a "bobbing" effect when in use. Although a number of geometric configurations can be utilized having a body 2 with a plurality of upper surfaces 4, as shown in the preferred embodiment a pyramidal configuration is utilized having an upper apex 9 opposite a bottom surface 10. The apex 9 aids the device 1 in achieving an upright condition when in use. The bottom surface 10 forms and supports a female threaded anchoring orifice 12. An anchor reel 14 threadingly affixes within the anchoring orifice 12, and further supports a sinker 16 via a sinker line 18, as will be described below in further detail. Additionally, a 10 plurality of line segments, shown here as a first line segment 19a, second line segment 19b, and third line segment 19c, are provided and supported each by an extension arm 6, as will also be described below in further detail.

Figure 2A:
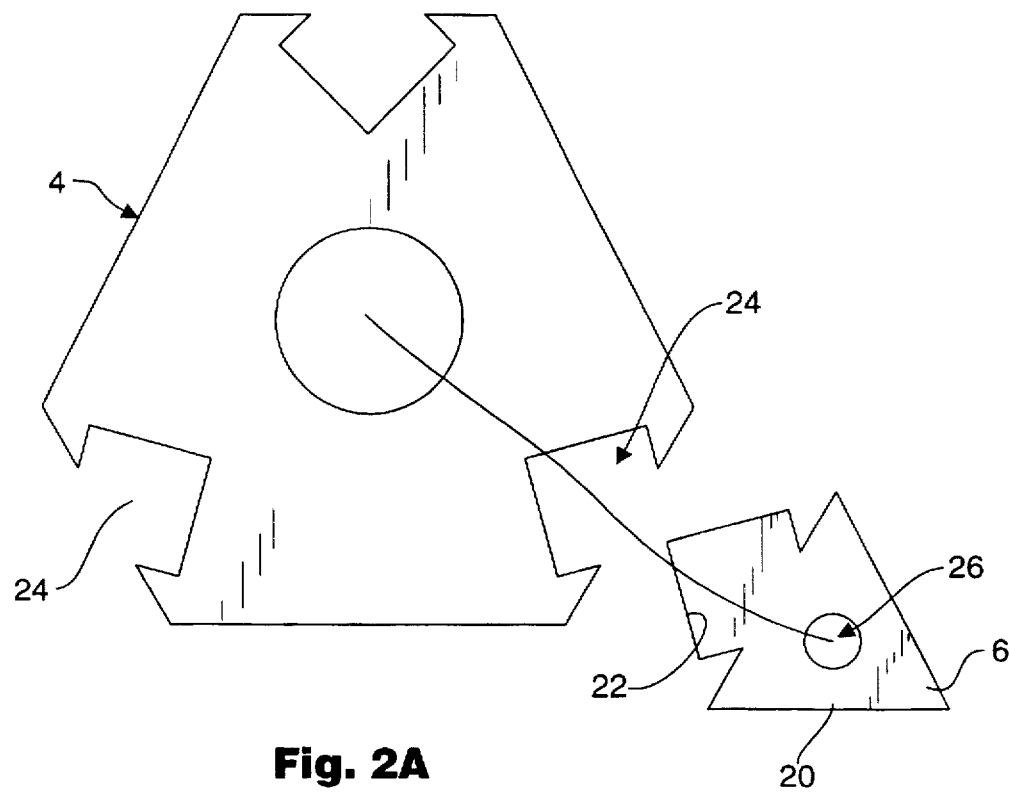
FIG. 2a is a bottom plan thereof.
Figure 2B:
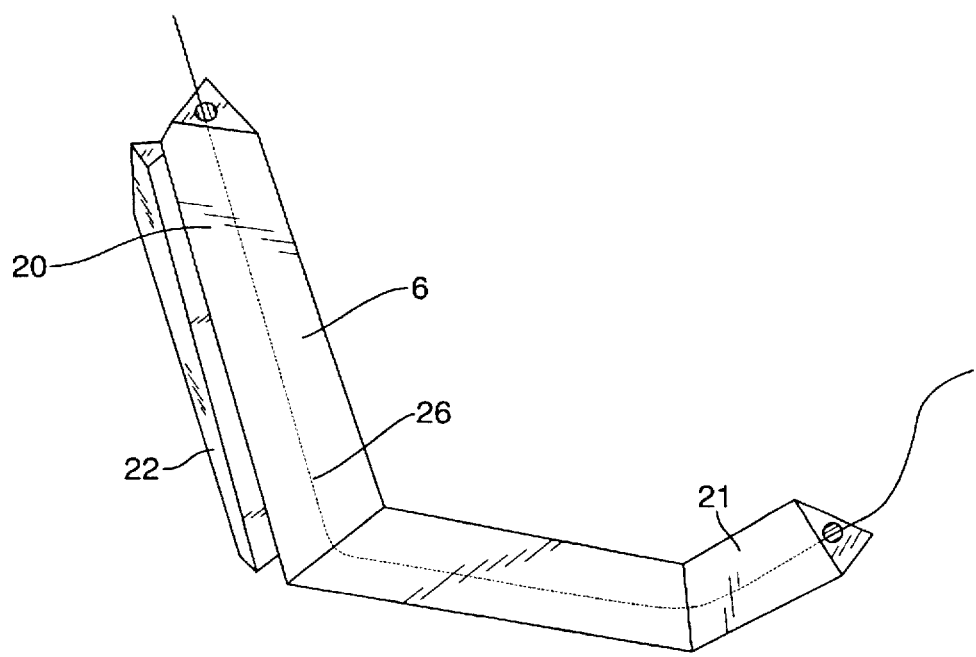
FIG. 2b is a side perspective view of an extension arm thereof.

Referring also to FIG. 2a and FIG. 2b, the extension arms 6 are shown in greater detail, with each having an inner guide portion 20 connected at an angle to an outward guide portion 21 and generally forming an "L" shaped structure. An arm retaining ridge 22 protrudes outward from and perpendicularly to the upper guide portion 20. The arm retaining ridge 22 slidingly inserts into and is retained by an arm receiving notch 24 which penetrates and is formed at each corner of adjacent individual upper surfaces 4. Although this particular embodiment of connecting the extension arm 6 to an upper surface 4 is shown, such a method is utilized in order to provide extension arms that can be disassembled, as well as easily manufactured and reassembled. However, it is envisioned that many conventional methods can be utilized to achieve such objectives.

Also, each extension arm 6 contains and forms a guide conduit 26 which provides continuous communication for a line segment 19 through the upper guide portion 20 as well as the outward guide portion 21.

Referring again to FIG. 1, at the top end of each line segment 19 is a barrel swivel 30, which allows for rotation in the line segment 19 without tangling. The barrel swivel 30 of all line segments 19 are held together by a retrieval hook 32. The retrieval hook 32 is retained by a snap swivel 34 which affixes the retrieval hook 32 to a standard fishing line 36. The standard fishing line 36 can lead to a conventional fishing rod. The bottom end of each line segment 19 is held outward away from other line segments as well as the body 2 by the corresponding extension arm 6. A conventional float 38 is affixed thereon, allowing the line segment 19 to be held upward, away from the body 2 and either at the surface of the water, or below, depending upon the desired length. A fishing hook 39 or other lure then terminates each line segment 19 in a manner conventional with currently available fishing techniques.

Figure 3:
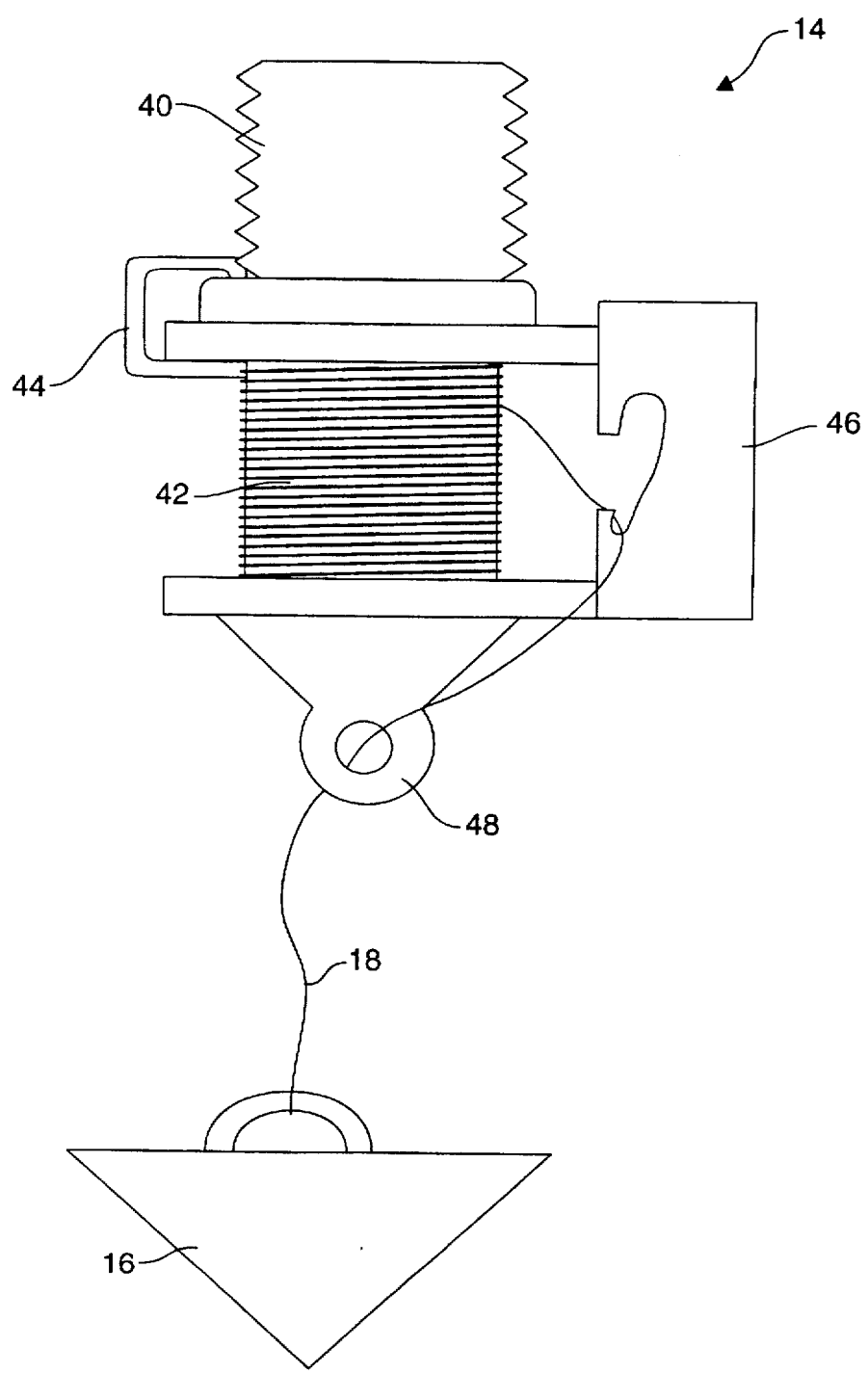
FIG. 3 is a side elevational view of the lower anchor portion thereof.

FIG. 3 shows the lower anchor portion of the present invention. The anchor reel 14 has a protruding, male threaded extension 40 which threadingly engages with the threaded anchoring orifice 12 in order to removably affix the anchor reel 14 to the body 2. The extension 40 is affixed to a line spool 42 of the type conventionally known, and supports a wound length of sinker line 18. The user can determine at what depth the device can be placed by unwinding a given length of sinker line 18. A spool locking means 44, shown herein as a locking clip, is utilized to fix the line spool 42 such that additional sinker line 18 is not discharged, nor the sinker line 18 retracted while the device is employed. It is also currently envisioned that the line spool 42 can be of a spring tensioned type, thereby facilitating rewinding of any deployed sinker line 18. As described above, the sinker line 18 is terminated at a sinker 16, herein depicted as a heavy, anchor shaped solid body. Due to the buoyant nature envisioned for the body 2 and the plurality of floats 38, the sinker 16 must be of a sufficient size and weight in order to prevent the adverse affects of waves and currents upon the device. Finally, it is envisioned that the sinker line 18 can easily become tangled, as with many conventional line spools 4, and therefore a first line guide 46 is provided to prevent tangling of the sinker line 18 upon the line spool 42, and a second line guide 48 is provided in order to aid in the guiding of the sinker line 18 in a vertical orientation.

2. Operation of the Preferred Embodiment

To use the present invention in accordance with a preferred embodiment of the present invention, a user can easily transport the fish catching device 1 in a disassembled state. Each guide conduit 26 is threaded with a desired length of line segment 19. Once the extension arm 6 is threaded, assembly is quick and easy by affixing the multiple extension arms 6 to the body 2 by inserting the arm retaining pin 22 into its respective arm receiving aperture 24. The retrieval hook 32, mounted via a fishing line to a conventional fishing rod, is then affixed to the barrel swivels 30 of the various line segments 19. The floats 38 and fishing hooks 39 are also affixed to the line segments 19. The user can then complete the assembly of the fish catching device 1 by affixing the sinker 16 to the sinker line 18 and by threading the anchor reel 14 into the anchoring orifice.

With hooks baited, the user can then adjust the desired length of sinker line 18 and lock the line spool 42 into position. By submerging the fish catching device 1, the sinker 16 will lodge at the bottom of a lake, river, or the like. The buoyant body 2 is prevented from fully surfacing due to the desired length of sinker line 18. The body 2 thereby remains submerged, the sinker line 18 tensioned between the ballast forces of the sinker and the buoyant forces of the body 2. The extension arms 6 prevent the float-guided line segments from becoming intertangles, and the baited fishing hooks 39 are supported by the floats 28 in the same manner as if utilized in conjunction with a conventional fishing line. The entire device 1 can be monitored, and when desired retrieved by the user who merely reels in the fishing line 36 with his or her standard fishing rod.

The foregoing description is included to illustrate the operation of the preferred embodiment and is not meant to limit the scope of the invention. It would be obvious to one skilled in the pertinent arts that many modifications and differing configurations of the present invention can be developed utilizing the teachings within the present disclosure. For example, floats can be replaced by split shots in order to provide a platform for attracting fish of various feeding habits. Another example provides for the use of recycled plastic materials in the formation of the body and extension arm. Different colors can also be used to aid in luring or retrieval, as well as the addition of a break-away sinker, should snagging become a problem. Although not an exhaustive list, many other variations can be achieved as a result of the disclosure herein. Therefore, the scope of the invention is to be limited only by the following claims.

What is claimed is:

1. A fish catching device for use in conjunction with a conventional fishing rod, said fish catching device comprising:

a main body, said main body being buoyant and floatable, said main body further forming a plurality of upper surfaces, and a bottom surface which forms and supports a female threaded anchoring orifice;

a plurality arm receiving notches which penetrate the main body and are formed at the intersection of each adjacent individual upper surfaces;

a plurality of extension arms, one each affixed to each said arm receiving notch;

a plurality of line segments, one each supported and retained by a corresponding extension arm, each said line segment having a first end and a second end;

a retrieval hook affixed to said fishing rod via a fishing line, said retrieval hook for affixing to said first end of said line segments;

a fishing hook affixed to each of said second end of said line segment;

an anchor reel having a protruding, male threaded extension for threadingly engaging with said threaded anchoring orifice in order to removably affix the anchor reel to the body, said anchor reel further having a line spool for supporting a wound adjustable length of sinker line; and a sinker affixed to said sinker line for providing ballast for submerging said fish catching device.

2. The fish catching device as described in claim 1, further comprising a spool locking means for fixing the line spool at a predetermined position such that additional sinker line is not discharged, nor the sinker line retracted while the device is employed.

3. The fish catching device as described in claim 1, further comprising:

a first line guide for preventing tangling of the sinker line upon the line spool; and a second line guide for guiding of the sinker line in a vertical orientation.

4. The fish catching device as described in claim 1, wherein said main body comprises a pyramidal configuration having an upper apex opposite a bottom surface and forming a hollow cavity.

5. The fish catching device as described in claim 1, wherein each said extension arm comprises:

an upper guide portion;

an outward guide portion connected at an angle to said upper guide portion and generally forming an "L" shaped structure;

an arm retaining ridge protruding outward from and perpendicularly to said upper guide portion, said arm retaining ridge for inserting into and being retained by said arm receiving notch; and a guide conduit formed within said extension arm for providing continuous communication for a line segment through both said upper guide portion as well as the outward guide portion.

6. The fish catching device as described in claim 1, wherein said retrieval hook further includes a snap swivel which isolates rotational motion of said retrieval hook from being imparted to the fishing line in order to prevent or reduce tangling of the fishing line.

7. The fishing device as described in claim 1, wherein each said line segment further comprises a barrel swivel affixed at said first end for preventing rotational motion of said line segment from being imparted to any connected retrieval hook.

8. The fishing device as described in claim 1, further comprising a float affixed to each said line segment, thereby allowing the line segments to be held upward, away from the body and either at the surface of the water, or below, depending upon the desired line segment length.

9. The fishing device as described in claim 1, wherein both said body and said extension arms are made of recycled plastic material.

10. The fish catching device as described in claim 1, wherein said main body comprises a pyramidal configuration having an upper apex opposite a bottom surface and forming a hollow cavity.

11. In a fish catching device having a main body, said main body being buoyant and floatable, a plurality of extension arms affixed to said main body, a plurality of line segments, one each supported and retained by a corresponding extension arm, each said line segment having a first end and a second end, and a fishing hook affixed to said second end of each of said line segments, wherein the improvement comprises:

said main body further forming a plurality of upper surfaces, and a bottom surface which forms and supports a female threaded anchoring orifice;

arm receiving notches which penetrate the main body and are located between adjacent individual upper surfaces;

each said extension arm comprises an upper guide portion and an outward guide portion connected at an angle to said upper guide portion and generally forming an "L" shaped structure, an arm retaining ridge protrudes outward from and perpendicularly to said upper guide portion, said arm retaining ridge for inserting into and being retained by said arm receiving notch, and a guide conduit formed within said extension arm for providing continuous communication for a line segment through both said upper guide portion as well as the outward guide portion;

a retrieval hook affixed to said a fishing rod via a fishing line, said retrieval hook for affixing to said first end of said line segments;

an anchor reel having a protruding, male threaded extension for threadingly engaging with said threaded anchoring orifice in order to removably affix the anchor reel to the body, said anchor reel further having a line spool for supporting a wound adjustable length of sinker line; and a sinker affixed to said sinker line for providing ballast for submerging said fish catching device.

12. In the fish catching device described in claim 11, wherein the improvement further comprises a spool locking means for fixing the line spool at a predetermined position such that additional sinker line is not discharged, nor the sinker line retracted while the device is employed.

13. In the fish catching device as described in claim 11, wherein the improvement further comprises:

a first line guide for preventing tangling of the sinker line upon the line spool; and a second line guide for guiding of the sinker line in a vertical orientation.

14. The fish catching device as described in claim 11, wherein said retrieval hook further includes a snap swivel which isolates rotational motion of said retrieval hook from being imparted to said fishing line in order to prevent or reduce tangling of the fishing line.

15. The fishing device as described in claim 11, wherein each said line segment further comprises a barrel swivel affixed at said first end for preventing rotational motion of said line segment from being imparted to the retrieval hook.

16. The fishing device as described in claim 11, further comprising a float affixed to each said line segment, thereby allowing the line segments to be held upward, away from the body and either at the surface of the water, or below, depending upon the desired line segment length.

17. The fishing device as described in claim 11, wherein both said body and said extension arms are made of recycled plastic material.

* * * * *